(12) United States Patent
Thrasher

(10) Patent No.: US 9,126,291 B1
(45) Date of Patent: Sep. 8, 2015

(54) METHOD AND APPARATUS FOR REPAIR OF VEHICLE DOOR HANDLES

(76) Inventor: Zach Thrasher, Winter Park, FL (US)

( * ) Notice: Subject to any disclaimer, the term of this patent is extended or adjusted under 35 U.S.C. 154(b) by 167 days.

(21) Appl. No.: 13/532,661

(22) Filed: Jun. 25, 2012

Related U.S. Application Data

(60) Provisional application No. 61/500,170, filed on Jun. 23, 2011.

(51) Int. Cl.
*B23P 6/00* (2006.01)
*B25B 27/08* (2006.01)
*E05B 85/12* (2014.01)

(52) U.S. Cl.
CPC . *B23P 6/00* (2013.01); *B25B 27/08* (2013.01); *E05B 85/12* (2013.01); *Y10T 29/4973* (2015.01); *Y10T 29/49718* (2015.01); *Y10T 29/49721* (2015.01); *Y10T 29/49726* (2015.01); *Y10T 29/49741* (2015.01); *Y10T 29/49746* (2015.01); *Y10T 29/49815* (2015.01); *Y10T 29/49826* (2015.01); *Y10T 29/49885* (2015.01); *Y10T 29/49947* (2015.01)

(58) Field of Classification Search
CPC ............. B23P 6/00; B25B 27/08; E05B 5/12; E05B 85/12; E05B 85/14; Y10T 29/49718; Y10T 29/49815; Y10T 29/49721; Y10T 29/49726; Y10T 29/4973; Y10T 29/49741; Y10T 29/49746; Y10T 29/49826; Y10T 29/49885; Y10T 29/49947
USPC ............... 29/402.01, 402.03, 402.06, 402.08, 29/402.12, 402.14, 426.1, 426.4, 426.5; 292/336.3
See application file for complete search history.

(56) References Cited

U.S. PATENT DOCUMENTS

2014/0035300 A1*   2/2014   Kindig ........................ 292/336.3

\* cited by examiner

*Primary Examiner* — John C Hong
(74) *Attorney, Agent, or Firm* — Larry D. Johnson

(57) ABSTRACT

A repair kit to repair broken interior door handle assemblies on certain vehicles. The method includes removing the original (broken) door handle housing from the back side of the door panel by removing the plastic rivets. The replacement housing is then installed on the back side of the door panel in place of the original over the posts and tab(s) on the door panel, and fasteners are placed over the posts and pushed down to press the flange of the replacement housing tightly against the back side of the door panel. A hole is drilled through the base of the tab, and a fastener is inserted through the hole and bent around the tab to similarly secure the flange.

6 Claims, 3 Drawing Sheets

METHOD AND APPARATUS FOR REPAIR OF VEHICLE DOOR HANDLES

CROSS REFERENCE TO RELATED APPLICATIONS

The present application claims the benefit of the filing date of U.S. Provisional Patent Application Ser. No. 61/500,170, filed Jun. 23, 2011. The foregoing application is incorporated by reference in its entirety as if fully set forth herein.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to vehicles and vehicle repair, and more particularly to an improved method and apparatus for the repair of certain types of original equipment interior door handles on vehicles.

BACKGROUND INFORMATION AND DISCUSSION OF RELATED ART

Some vehicles, including many Jeep Grand Cherokees from the 2004 to 2011 model years, and Jeep Commanders from the 2006 model year to the present, appear to have a weak area in the interior door handles, and many of the handles in these vehicles have broken over time. Unfortunately, the interior door handles on some of these vehicles are integrated into the door panel and are generally not serviceable by themselves, instead, the entire interior door panel has to be replaced in order to replace the door handle. For example, the interior door handle housing on the aforementioned Jeep vehicles is not attached with screws but is plastic welded into the door panel. On many other types of vehicles, the interior door handles are serviceable by themselves, which makes the repair much less expensive.

The foregoing information reflects the current state of the art of which the present inventor is aware. Reference to, and discussion of, this information is intended to aid in discharging Applicant's acknowledged duty of candor in disclosing information that may be relevant to the examination of claims to the present invention. However, it is respectfully submitted that none of the above-indicated information discloses, teaches, suggests, shows, or otherwise renders obvious, either singly or when considered in combination, the invention described and claimed herein.

SUMMARY OF THE INVENTION

The method and apparatus for the repair of vehicle door handles of the present invention provides an interior door handle repair kit that can be used to repair broken interior door handle assemblies on certain vehicles such as the Jeep Grand Cherokee (e.g., model years 2004 to 2011) and Jeep Commander (e.g., model years 2006 to the present). The inventive kit permanently solves the problem of prematurely broken door handles by replacing the brittle original equipment door handle support housing with a replacement housing constructed of very strong composite material, and includes all the components and fasteners necessary to repair the interior door handles on one or all of the doors, without having to replace the entire door panels.

The inventive method includes removing the original (broken) door handle housing from the back side of the door panel by drilling or otherwise removing the plastic rivets that secure the original handle housing to the door panel. The posts and tab(s) that extend from the back side of the door panel through corresponding apertures in the original housing are not removed, and are maintained for later use. After the rivets have been removed, the original door handle housing can be removed from the door panel and discarded. The replacement door handle housing is then installed on the back side of the door panel over the original posts and tab(s), and push nut retainers or other fasteners are placed over the posts and pushed down to press the flange of the replacement housing tightly against the back side of the door panel. A hole is drilled through the base of the tab, and a cotter pin or other fastener is inserted through the hole and bent around the tab to similarly secure the flange of the replacement housing tightly against the door panel.

The inventive repair kit preferably includes replacement interior door handle support housings for all four doors (driver's front door; driver's side rear passenger door; passenger side front door; and passenger side rear door); push nut retainers; cotter pins; and simple detailed instructions with pictures for installation. The original color for the kit components may be grey, tan, or other original equipment color, or the parts can be painted to match door panels, or may be used without matching colors. The components of the repair kit may be modified to provide a corresponding kit for other vehicles.

It is therefore an object of the present invention to provide a new and improved vehicle interior door handle repair kit.

It is another object of the present invention to provide a new and improved method for replacing the original equipment door handle housing with a replacement housing constructed of very strong composite material.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
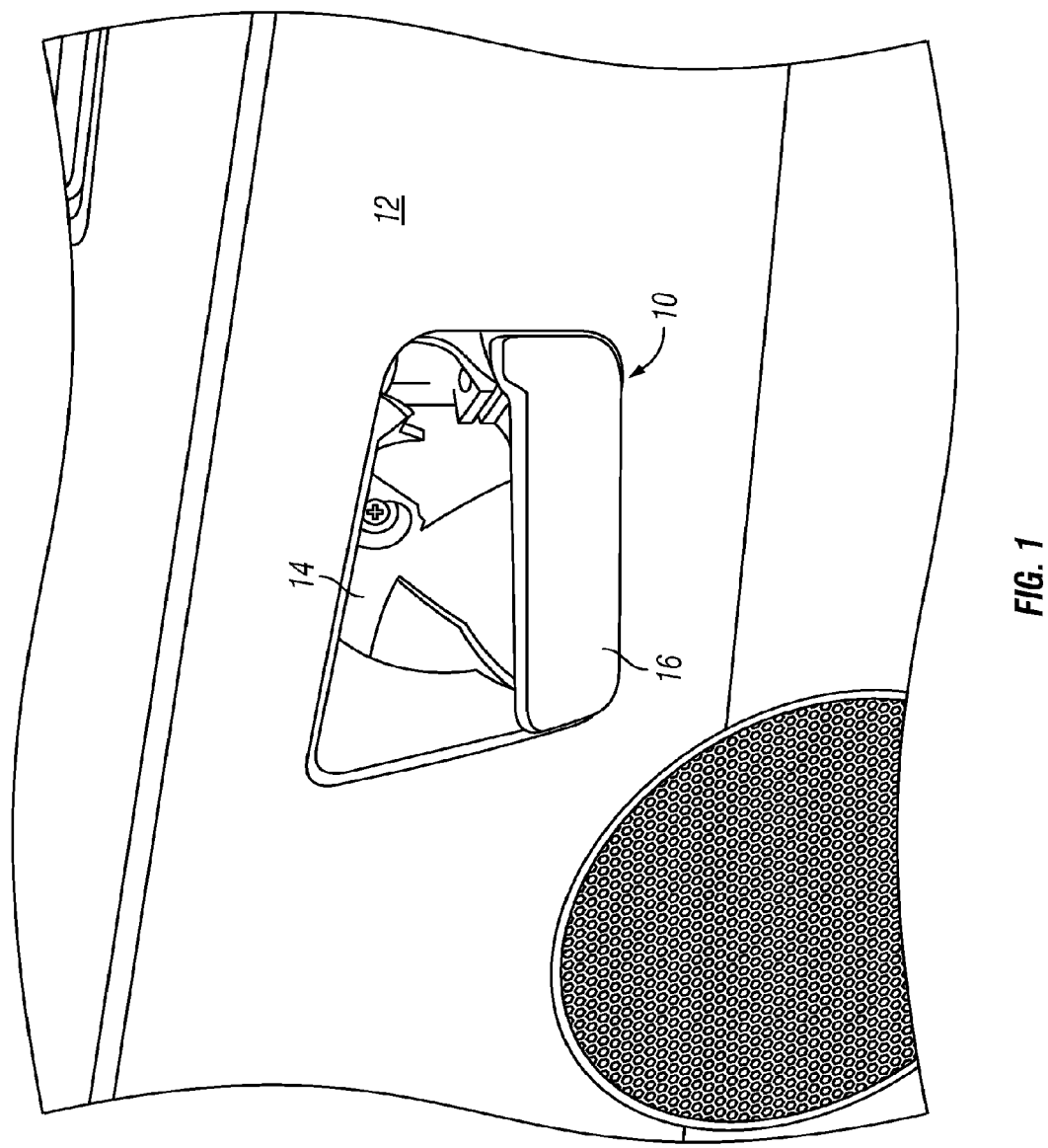
FIG. 1 is a front elevation view of a broken door handle on an interior door panel of a vehicle.
Figure 2:
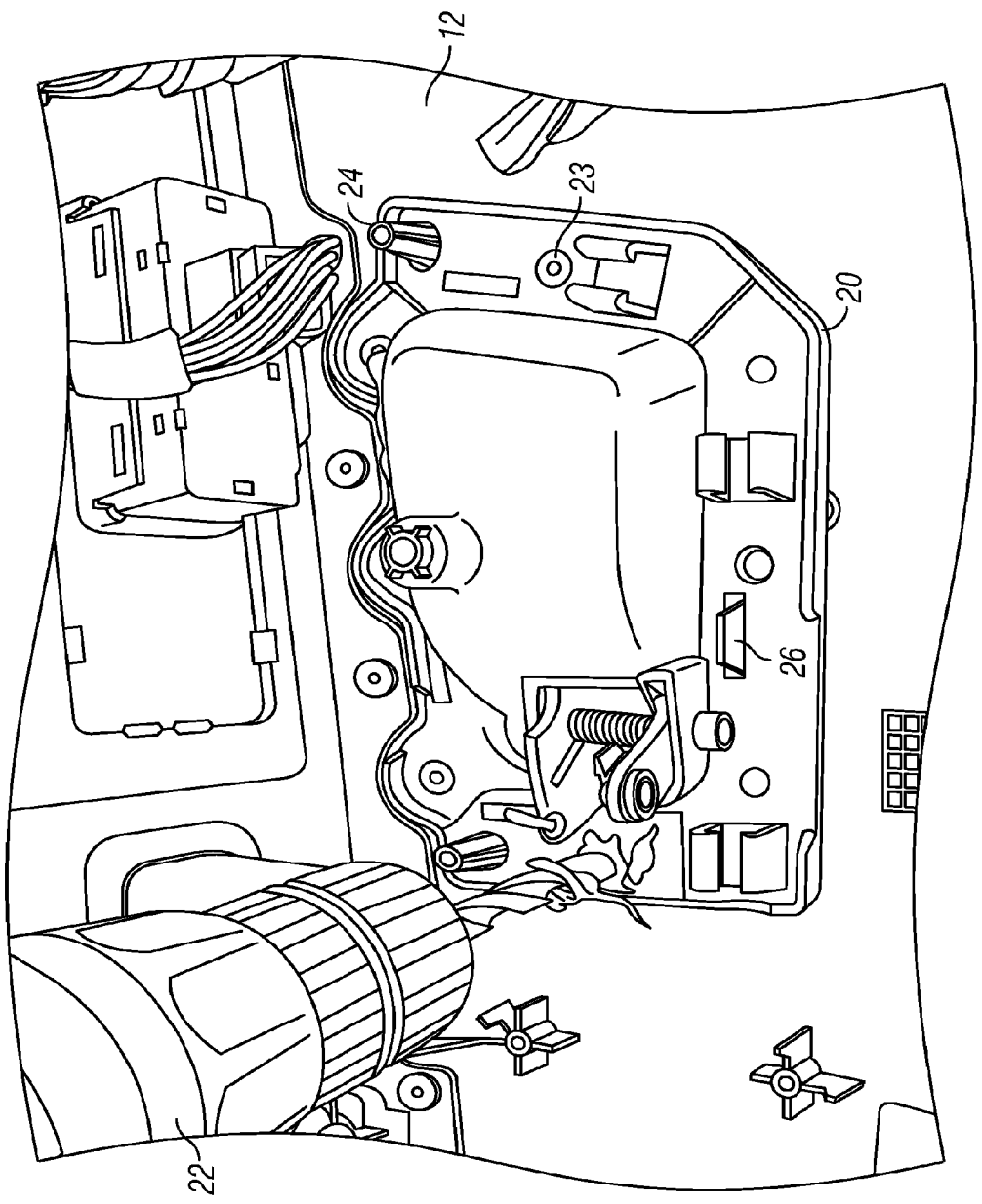
FIG. 2 is a rear view of the original door handle housing being removed from the back side of the door panel.
Figure 3:
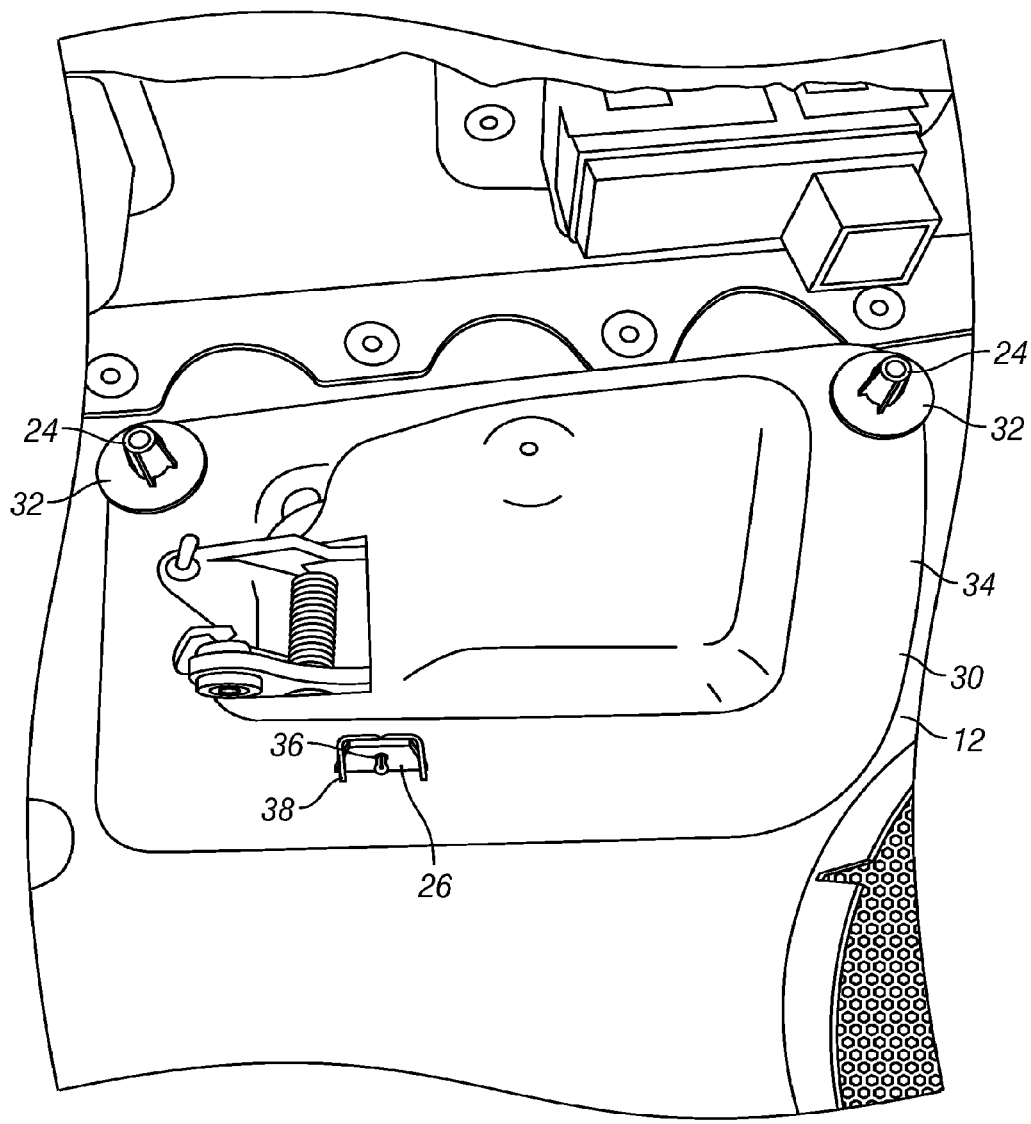
FIG. 3 is a rear view of a replacement door handle housing installed on the back side of the door panel.

Referring to FIGS. 1 through 3, wherein like reference numerals refer to like components in the various views, there is illustrated therein a new and improved method and apparatus for the repair of vehicle interior door handles.

FIG. 1 is a front elevation view of a broken door handle assembly 10 on an interior door panel 12 of a vehicle. Door handle assembly 10 includes handle support housing 14 and handle lever 16.

FIG. 2 is a rear view of the original (broken) door handle housing 20 in the process of being removed from the back side of the door panel 12. Drill 22 is being used to drill out the plastic rivets 23 that plastic welded and permanently secured the original handle housing 20 to the door panel 12. Alternatively, a razor knife or other tool could be used to remove the rivets. Posts 24 and tab 26 extend from the back side of the door panel through corresponding apertures in the original housing, but are not removed, and are maintained for later use. After the rivets have been removed, the original door handle housing can be removed from the door panel.

FIG. 3 is a rear view of a replacement door handle housing 30 having been installed on the back side of the door panel 12 in place of the original. Push nut retainers 32 have been placed over the posts 24 and pushed down to press the flange 34 of the replacement housing tightly against the back side of the door panel. Alternatively, spring clips, locking tabs, or other fasteners could be used on the posts to retain the replacement housing against the door panel. A hole 36 has been drilled through the base of tab 26, and cotter pin 38 has been inserted through the hole 36 and bent around the tab to similarly secure the flange of the replacement housing tightly against the door panel. Alternatively or optionally, adhesive may be applied between the flange of the replacement housing and back side of the door panel (prior to tightening of the push nuts and placement of the cotter pin in the tab, if they are used) to provide bonding and help prevent gaps between the surfaces.

Typical customer instructions for the repair of broken interior door handles on a Jeep Cherokee type vehicle may include the following:

Tools required: drill, flat screwdriver, Phillips screwdriver, razor blade, and hammer, and a rag and a plastic adhesive are recommended. Note: Some minor modification of the door panel or handle kit may be necessary to ensure a perfect fit. This is an aftermarket part.

Step 1 (removing the door panel): Remove the screws from the door panel. After all of the screws are removed, carefully pry the panel from the door using the flat head screwdriver (use of a rag is recommended to protect the paint). The panel will pry loose with ample pressure (multiple clips attach the panel to the door). Once loose, lift up on the panel until it is above the lock mechanism. Once the panel is loose, carefully remove any electrical clips. Next, disconnect the rod that is attached to the door handle. Slide the clip to the side off of the rod. The plastic clip simply clips onto the rod. Once unclipped, the rod will lift out of the handle.

Step 2 (door handle removal): Start by lying the door panel down on a flat surface, backside facing up. Using a large drill bit, razor knife, or other tool, remove the tops off the plastic rivets (e.g., typically 6 rivets +/−). Carefully drill or cut only the rivets and handle housing as necessary, taking care not to drill through the door panel itself. Once all the rivets have been drilled or cut out, the handle housing will easily detach from the door panel. Use the razor blade to remove any excess plastic shavings on the panel.

Step 3 (installing the new handle on the door panel): Line the holes and slots of the replacement housing up with the posts (typically two) and tabs (typically 3-4) of the door panel. Press the housing down until it is flush with the panel (some minor modification may be necessary with the razor blade). Ensure that you are installing the correct handle (e.g., Driver/Front, Passenger/Rear, etc). An adhesive such as a two part epoxy or adhesive tape may be applied to one or more locations (such as the plastic weld locations) to help secure the replacement housing and eliminate gaps. Once the handle is lined up and pressed flush, using the flat head screwdriver (or a socket), press the provided push nut retainers down the posts until the handle housing is tight on the door panel. Next, use a $1/16^{th}$ inch drill bit to drill through the base of the lowermost tab that protrudes through the bottom of the housing. Make sure the housing is pressed down flush when drilling the tab to avoid a gap between the housing and the door panel. Once drilled, insert the provided cotter pin. Using a screwdriver, bend and manipulate the cotter pin around the tab. Now that the handle housing is completely installed, you can replace the door panel on the vehicle. Follow the removal instructions in reverse.

Typical customer instructions for the repair of broken door handles on a Jeep Commander type vehicle may include the following. In this example, the original handle lever is to be removed and reused, and the instructions include steps for installation of the lever in the replacement housing.

Tools required: drill, flat head screwdriver, Phillips head screwdriver, razor blade, and hammer. Note: "Before" and "After" pictures are recommended to ensure that you install the handles in the correct direction. The housings appear similar; and incorrect installation may result in loss of hardware.

Step 1 (removing the door panel): Remove the screws from the door panel. After all of the screws are removed, carefully pry the panel from the door using the flat head screwdriver. The panel will pry loose with ample pressure. Once loose, lift up on the panel until it is above the lock mechanism. Once the panel is loose, carefully remove any electrical clips. Next, disconnect the rod that is attached to the door handle. Slide the clip to the side off of the rod (the plastic piece simply clips onto the rod). Once unclipped, the rod will push down and out of the handle.

Step 2 (removing the door handle): Start by lying the door panel down on a flat surface, backside facing up. Using a large drill bit, razor knife, or other tool, remove the top of the plastic rivets. Carefully drill or cut only the rivets and handle housing; do not drill through the door panel itself. Once all the rivets have been drilled or cut out, the handle housing will easily detach from the door panel. Use the razor blade to remove any excess plastic shavings on the panel.

Step 3 (removing handle from housing): The handle lever will be used in the new housing. To remove the handle lever, use a hammer and screwdriver to knock the pin out (watch spring carefully as it is under pressure). Once the pin is removed, the spring will fall out. You can now remove the handle lever and separate it from the old housing. Note: keeping pressure on the spring while removing the pin is helpful and will keep the spring from falling out. You may also remove the small rubber stopper from the old housing and place it into the corresponding tab on the replacement housing.

Step 4 (installing the handle in new housing): Start by inserting the handle lever into the new housing. This part can be tricky, but carefully insert and twist to allow the handle to fit into the housing properly. The use of force is not necessary. When faced with resistance, change your approach. Once the handle is inserted, line up the holes on the handle with the holes on the housing. The spring has two ends: one is straight and the other is bent. The side that is bent will be inserted into the handle and the straight side will rest against the housing. This will have the spring sticking out (pictures show the spring at rest and out of alignment as it should be). Now use your thumb to compress the spring into alignment and begin to insert the pin. Ensure that the pin goes through the housing, handle, and spring. Now take the small push nut retainer and press it over the pin until it reaches the housing. Once the pin is inserted all the way, and the retainer is attached, you can test the handle in the housing before moving on to the next step.

Step 5 (installing new handle on door panel): Line up the holes in the replacement housing with the posts (typically two) on the door panel. Ensure that the handle will be facing the correct direction before continuing. Press the housing down until it is flush with the panel. Note: some minor modification may be necessary with the razor blade. The driver's side and passenger side are different. Ensure that you are installing the corresponding housing. Once the handle is lined up and pressed flush, using the flat head screwdriver, or a deep socket that fits, press the provided push nut retainers down the posts until the handle housing is tight on the door panel. Do not apply enough pressure to bend or crack the housing. Now that the handle is completely installed, you can replace the door panel on the vehicle. Follow the removal instructions in reverse.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A method for repairing a broken interior door handle housing on an interior door panel on a door of a vehicle, the broken interior door handle housing integrated into the interior door panel by a plurality of rivets, the interior door panel bearing at least one post extending from the interior door panel through a corresponding aperture in the broken interior door handle housing, the method comprising:
   removing the interior door panel from the door;
   removing the broken interior door handle housing from the interior door panel by removing the plurality of rivets and detaching the broken interior door handle housing;
   installing a replacement interior door handle housing on the interior door panel such that the at least one post on the interior door panel extends through an aperture in the replacement interior door handle housing;
   placing a retainer over the at least one post on the interior door panel to press the replacement interior door handle housing against the interior door panel; and
   replacing the interior door panel on the door.

2. The method of claim 1 wherein the step of removing the broken interior door handle housing from the interior door panel by removing the rivets and detaching the broken interior door handle housing comprises removing the rivets with a drill.

3. The method of claim 1 wherein the step of removing the broken interior door handle housing from the interior door panel by removing the rivets and detaching the broken interior door handle housing comprises removing the rivets with a razor knife.

4. The method of claim 1 wherein the interior door panel further includes a tab extending from the interior door panel through a corresponding aperture in the broken interior door handle housing, and the step of installing a replacement interior door handle housing on the interior door panel comprises installing the replacement interior door handle housing on the interior door panel such that the tab on the interior door panel extends through an aperture in the replacement interior door handle housing.

5. The method of claim 4 wherein the step of installing a replacement interior door handle housing on the interior door panel includes drilling a hole in the tab and inserting a cotter pin in the hole to secure the replacement interior door handle housing against the interior door panel.

6. The method of claim 1 wherein the step of installing a replacement interior door handle housing on the interior door panel further includes applying adhesive between the interior door panel and the replacement interior door handle housing.

* * * * *